United States Patent [19]
Schwartz

[11] 3,865,404
[45] Feb. 11, 1975

[54] MOUNTING UNIT FOR A TRACTOR PULLED MOWER

[76] Inventor: Dale R. Schwartz, R.R. 2, Hendrick, Iowa 52563

[22] Filed: May 17, 1974

[21] Appl. No.: 471,001

[52] U.S. Cl. .......................... 280/415 A, 280/460 A
[51] Int. Cl. .............................................. B60d 1/14
[58] Field of Search ........ 280/415 A, 460 R, 460 A, 280/461 A, 461 R, 415 R

[56] References Cited
UNITED STATES PATENTS

| | | | |
|---|---|---|---|
| 3,031,208 | 4/1962 | Abbott | 280/460 A |
| 3,338,594 | 8/1967 | Schuler | 280/415 A |
| 3,472,528 | 10/1969 | Richey et al. | 280/415 A |

Primary Examiner—Leo Friaglia
Attorney, Agent, or Firm—Rudolph L. Lowell

[57] ABSTRACT

The mounting unit is adapted for use with a tractor that has a horizontally swingable drawbar and a support therefor and comprises a frame assembly having spaced interconnected horizontal plate members for receiving the drawbar therebetween when the forward section of the frame assembly is positioned within a guideway formed in the drawbar support. With the drawbar held against horizontal and vertical movement relative to the frame assembly, a pull behind tractor mower is connectible to the mounting unit by mower supported releasable clamps that are attachable to transverse pivot means carried at the rear end of the mounting unit.

4 Claims, 5 Drawing Figures

PATENTED FEB 11 1975 3,865,404
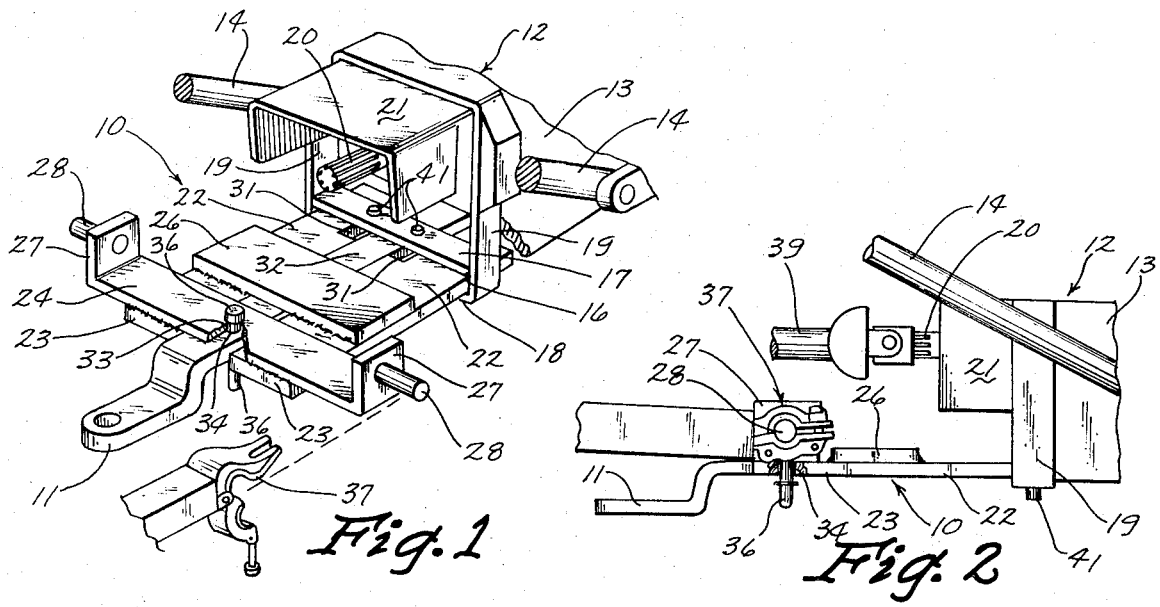
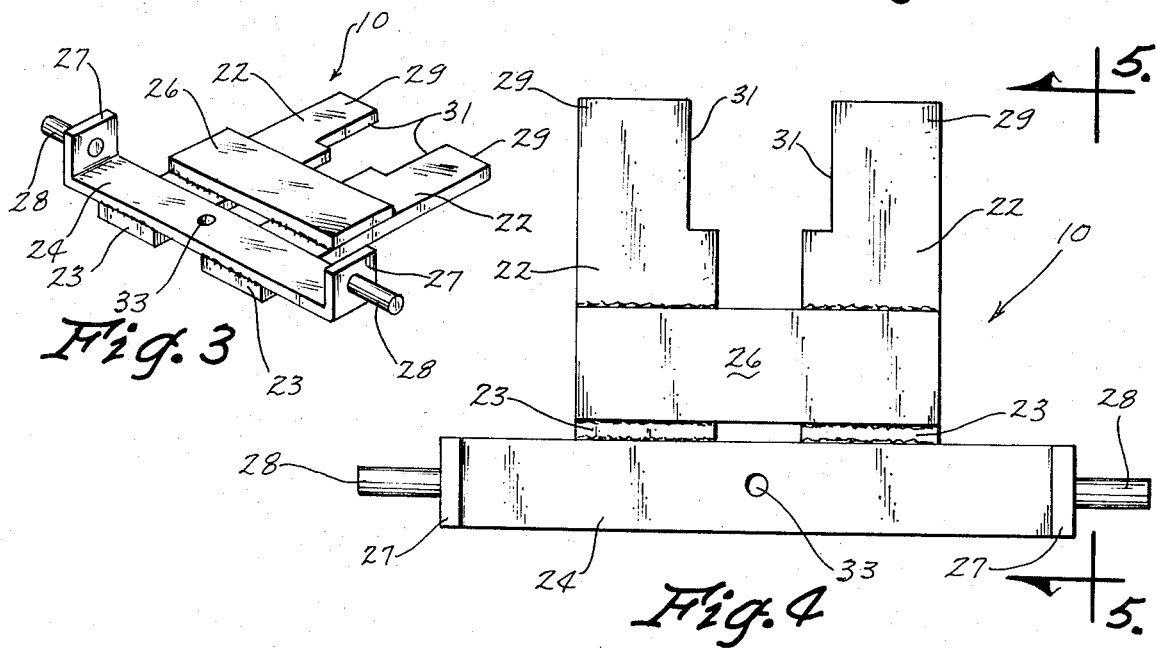
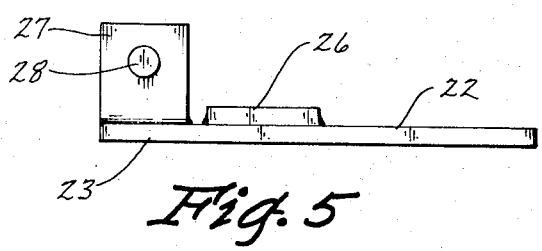

MOUNTING UNIT FOR A TRACTOR PULLED MOWER

SUMMARY OF THE INVENTION

The mounting unit for a tractor pulled mower is of a simple and integral construction and light in weight for easy handling by one man to quickly connect and disconnect the mower with a minimum of time and effort. The swinging drawbar and support therefor are relatively assembled with the mounting unit to provide a positive and readily accessible hitch connection for the mower and a positioning of the tractor power take-off in a driving relation with the mower drive shaft. The tractor is thus made quickly available for farm operations, other than mowing, to provide for its efficient use in the handling of multiple farm jobs.

BRIEF DESCRIPTION OF THE DRAWINGS

FIG. 1 is a rear perspective view of a tractor swinging drawbar and support therefor, shown in assembly relation with the mower mounting unit of this invention and with the mower disconnected therefrom;

FIG. 2 is a side elevation of the assembly shown in FIG. 1 with the mower shown connected to the mounting unit;

FIG. 3 is a rear perspective view of the mower mounting unit;

FIG. 4 is an enlarged plan view of the mower mounting unit; and

FIG. 5 is a sectional view taken on line 5—5 in FIG. 4.

DETAIL DESCRIPTION OF THE INVENTION

Referring to the drawing, the mower mounting unit of this invention, indicated generally as 10 in FIG. 1, is shown in assembly relation with a tractor swinging draw bar 11 and a draw bar support 12, which is secured in a well-known manner to the gear housing 13 of a tractor rear axle. Pivotally supported for up and down movement to opposite sides of the gear housing 13 is a pair of lift arms 14 that form part of a usual three-point hitch attachment. The draw bar 11 is suitably pivoted at its inner or forward end upon the gear housing 13 or other suitable structure for horizontal swinging movement within a guideway or opening 16 formed in the support 12. The guideway 16 is of a rectangular shape defined by a pair of vertically spaced side walls 17 and 18 that are interconnected by upright end walls 19. The tractor power take-off shaft 20 is positioned above the guideway 16 and partially enclosed by a shield or guard 21.

The mower mounting unit 10 FIGS. 3 and 4) includes a pair of longitudinally extended transversely spaced side plate members 22. The rear end sections 23 of the plate members 22 are connected together by a transverse connecting member 24 that is secured, as by welding, to the upper surfaces of the plate rear end sections 23. A second transverse connecting member 26 is secured to the top surfaces of the rear sections 23 at a position closely adjacent to the first transverse connecting member 24.

The connecting member 24 has end sections projected laterally outwardly from the plate members 22 so that upstanding ears 27 at the terrminal ends of the connecting member 24 are located outwardly from corresponding ones of the side plate members 22. Each ear 27 carried an outwardly projected pivot pin or shaft 28. These pins 28 have a common axis that extends transversely of the mounting unit 10. The inner sides of the front sections 29 of the plate members 22 are formed with transversely opposite longitudinally extended cutaway portions or notches 31 for a purpose to appear later.

As shown in FIG. 1, the forward end of the mounting unit 10 is of a width and thickness slightly smaller than the length and width of the guideway 16 for a guided reception within the guideway. To thus position the mounting unit relative to the drawbar support 12, the rear end section 32 of the drawbar, which is of a thickness substantially equal to the thickness of the plate members 22, is received in the space between the inner adjacent sides of the side plates 22. With the transverse connecting members 24 and 26 resting on the top surface of the draw bar, the mounting unit 10 is moved forwardly on the drawbar to a position wherein a longitudinally centered hole 33 in the transverse connecting member 24 is aligned with a lateraly extended opening 34 formed in the draw bar rear section 32. A holding pin 36 extended through the aligned openings 33 and 34 locks the draw bar against vertical movement relative to the connecting member 24. By virtue of the coacting abutting engagement of the forward outer sides of the plate members 22 with adjacent end walls 19 of the guideway 16 the drawbar 11 is locked against horizontal drifting or swinging movement.

The transverse connecting member 24 is thus rigidly supported on the draw bar 11 at a position rearwardly of the tractor gear housing 13. The mower (not shown) is of a usual type provided at its forward end with a pair of transversely spaced connecting clamp assemblies 37. A clamp assembly 37 (FIGS. 1 and 2) is releasably connected to a corresponding pin 28 to provide for the pivotal support of the front end of the mower on the rear end of the tractor. The mower drive shaft 39 is then connected to the tractor power take-off 20, as illustrated in FIG. 2.

In installations wherein the front end of the mounting unit 10 is of a width less than the longitudinal length of the guideway 16, a pair of stop pins 41 (FIG. 1) may be inserted through aligned openings in the guideway side members 17 and 18 arranged at opposite sides of the drawbar 11. These pins 41 extend through the side plate notches 31, and are engageable with opposite sides of the drawbar to prevent drifting thereof. It is to be understood that the various model and vintage tractors have draw bars of varying cross sectional dimensions and guideways 16 of varying cross sectional areas. It is contemplated, therefore, that the thickness of the side plates 22 and the transverse spacing therebetween be such as to accommodate the larger size dimension draw bar. Shims and spacers (not shown) may then be used to properly fit smaller dimension draw bars between the side plates 22. In this connection it is to be noted that when the outer sides of the plate members 22 do not function as stop portions to eliminate side drifting of the drawbar 11, the holding pins 41 may be used for such purpose.

Although the invention has been described with respect to a preferred embodiment thereof, it is to be understood that it is not to be so limited since changes and modifications can be made therein which are within the full intended scope of this invention as defined by the appended claims.

I claim:

1. A mounting unit for a tractor pulled mower wherein the tractor is equipped with a horizontally swingable drawbar and a support therefor that has a rearwardly facing guideway of a rectangular shape defined by a pair of vertically spaced side walls interconnected by end walls and wherein the rear section of the draw bar projects rearwardly from said guideway in resting engagement on the lower one of said side walls, said mounting unit comprising:
   a. a frame assembly including a pair of longitudinally extended horizontal side plate members spaced transversely a distance apart to receive said drawbar rear section therebetween;
   b. a transverse connecting member secured to the rear upper surfaces of said plate members, said connecting member having upright end walls spaced outwardly from adjacent plate members,
   c. a pivot means on each end wall releasably connected with the mower, said pivot means having a common axis extended transversely of said frame assembly,
   d. said plate members, when the drawbar is positioned therebetween, having the front end sections thereof receivable within said guideway,
   e. means for holding said drawbar against horizontal swinging movement relative to said frame assembly, and
   f. means for locking said drawbar against vertical movement relative to said frame assembly.

2. The mounting unit for a tractor pulled mower according to claim 1 wherein:
   a. said side walls are vertically spaced a distance apart slightly greater than the thickness of said drawbar, and each of said plate members is of a thickness substantially equal to the thickness of the drawbar, said plate members having the outer sides thereof spaced a distance apart slightly less than the longitudinal length of said guideway, whereby said holding means comprises coacting abutting portions on said plate members and guideway end walls.

3. The mounting unit for a tractor pulled mower according to claim 1 wherein:
   a. said means for holding said drawbar against horizontal swinging movement includes a pair of pin members extended through said vertically spaced side walls at opposite sides of said drawbar rear section.

4. The mounting unit for a tractor pulled mower according to claim 3 wherein:
   a. said plate members have transversely opposite laterally extended openings therein to receive said pin members.

* * * * *